United States Patent [19]

Blandin

[11] 4,311,654

[45] Jan. 19, 1982

[54] CONTROLLING RELEASE OF MOLDED MATERIAL FROM MOLD DURING CURING

[75] Inventor: Denis Blandin, Villiers-sur-Marne, France

[73] Assignee: Essilor International "Cie Generale d'Optique", Creteil, France

[21] Appl. No.: 121,912

[22] Filed: Feb. 15, 1980

[30] Foreign Application Priority Data

Feb. 20, 1979 [FR] France .............................. 79 04308

[51] Int. Cl.³ ............................................ B29D 11/00
[52] U.S. Cl. ..................................... 264/2.3; 264/317; 264/336; 264/338
[58] Field of Search ................... 264/1, 317, 334, 336, 264/338

[56] References Cited

U.S. PATENT DOCUMENTS

| | | |
|---|---|---|
| 2,279,859 | 4/1942 | Crawford . |
| 3,077,005 | 2/1963 | Sokol ........................................ 264/1 |
| 3,380,718 | 4/1968 | Neefe ........................................ 264/1 |
| 3,423,488 | 1/1969 | Bowser ..................................... 264/1 |
| 3,821,333 | 6/1974 | Goodwin et al. ........................ 264/1 |
| 3,935,292 | 1/1976 | Okubo ...................................... 264/1 |
| 3,938,775 | 2/1976 | Sarofeen .................................. 264/1 |
| 3,944,637 | 3/1976 | Bond et al. ............................... 264/1 |

*Primary Examiner*—James B. Lowe
*Attorney, Agent, or Firm*—Charles E. Brown

[57] ABSTRACT

A method and mould for moulding material requiring heat treatment for setting or curing, e.g., for making ophthalmic lenses. The mould comprises an annular gasket and two opposed die members which together define a moulding cavity. One of the die members is made in part of a fusible material, e.g. paraffin wax, which defines its moulding surface. After filling the mould the moulding material is subjected to heat treatment. The drop point or softening point of the fusible material falls within the range of temperatures of heat treatment so that in the course of such heat treatment of fusible material effectively releases the moulded material. This relieves stresses which would otherwise develop due to shrinking of the moulded material.

6 Claims, 10 Drawing Figures

CONTROLLING RELEASE OF MOLDED MATERIAL FROM MOLD DURING CURING

The present invention relates generally to a moulding of any kind of moulding material requiring heat treatment for setting or curing, and more particularly to moulding ophthalmic lenses of organic material.

As is well known such moulding is usually performed with a mould having a moulding cavity defined by three separate mould components, i.e., an annular gasket or sealing member, and a die member having a concave moulding surface and a die member having a convex moulding surface respectively disposed at opposite ends of said annular gasket.

It is also well known that the most commonly used organic materials employed for moulding ophthalmic lenses require for their setting or curing, which amounts to a polymerisation, the application of heat. During setting or curing a not insubstantial amount of shrinking occurs.

The mould component employed must compensate for the shrinkage, and in particular the die members customarily have generally parallel surfaces of relatively reduced section or thickness made of glass, most often tempered glass.

But owing to this shrinkage, during the setting or curing of the moulding material not insubstantial stresses develop between the die members which may produce premature release or unmoulding of one of the die members which is prejudicial to both the die members and the ophthalmic lenses cast thereby.

In actual practice in the particularly delicate situation where the ophthalmic lens to be moulded is a so-called "executive" type lense, i.e., a lens having on its convex surface at least one edge delimiting two zones of different curvatures, the corresponding die member having a concave moulding surface is most often the side which unmoulds or releases prematurely.

This uncontrolled premature unmoulding or release results in an ophthalmic lens having defects due to incorrect or improper polymerisation which must then be eliminated.

Further, this premature unmoulding or release is most often accompanied by damage to the edge of the lens to be moulded as well as the corresponding edge of the die member having a concave moulding surface which is subjected to premature unmoulding or release.

An object of the present invention is an arrangement enabling uncontrolled, premature unmoulding or release to be overcome.

According to one aspect of the invention there is provided a method of moulding materials requiring heat treatment for setting or curing in which a mould is used having a plurality of mould components with moulding surfaces together defining a moulding cavity, comprising forming at least part of one of the mould components of a fusible material, the fusible material extending along at least part of the associated moulding surface and outwardly therefrom, the fusible material effectively releasing the material moulded in the moulding cavity in the course of setting or curing. It therefore follows that the fusible material should be selected to have a drop point or softening point within the range of temperatures for heat treatment to set or cure the moulding material.

According to another aspect of the invention there is provided a mould for moulding materials requiring heat treatment for setting or curing, the mould comprising a plurality of mould components having moulding surfaces together defining the moulding cavity of the mould, one of the mould components being formed at least in part of fusible material, the fusible material extending along at least part of the associated moulding surface and outwardly therefrom, the fusible material being operative to release the moulded material in the course of setting or curing.

The one mould component may be made entirely of the fusible material.

Preferably, only part of the mould component is made of the fusible material, the mould component having a transformable surface film of fusible material defining all or part of the associated moulding surface, this film being formed by a coating applied in situ or by a pre-formed film subsequently attached by any suitable means.

In any event the material of which the fusible material is capable of changing or altering its physical properties, comparable to a change of state, whether it is a change of state from solid to liquid or mere softening.

Therefore during the corresponding heat treatment the temperature reaches the temperaure of the change of state of the fusible material of the one mould component, at least the part of its moulding surface alters and for example it is eliminated by melting thereby releasing the one mould component of the moulding cavity or, in other words, unmoulds the corresponding part of the moulded article.

This is, of course, premature release of the moulded article with respect to the overall moulding process. But the premature release occurs at a predetermined point in time which corresponds to the temperature of the change of state of the fusible material forming the associated moulding surface this temperature being predetermined for a given material which may therefore be selected to this end.

Indeed, the present invention is based on the observation that the moulding process which has a dual function of imparting a certain form to the moulded material and protecting the moulding material from air during moulding so that it cannot inhibit setting or curing, it is possible to effect premature release without jeopardising the ultimate qualities of the moulded material if the premature release occurs at a particular point in the corresponding setting or curing process. In other words, the premature release of the moulded article is perfectly controlled or predetermined at this temperature.

In actual practice when moulding ophthalmic lenses, preferably the die member having the convex moulding surface is provided with the fusible material.

In the course of premature release by the moulding surface defined by the fusible material, there is generally produced a reduction of the stresses which develop in the moulding cavity caused by the shrinkage of the moulding material which assists the die member having the concave moulding surface, by permitting the disengagement of the concave moulding surface from the convex surface of the already polymerised lens being moulded, the fluidtightness of the moulding cavity defined by the die members and the intermediate gasket being maintained until the end of the overall moulding process so as not to interfere with the polymerisation of the already polymerised lens.

Whereupon there is no damage to the die member having the concave moulding surface and the resulting ophthalmic lenses have no defects which need to be eliminated or corrected.

To be sure, U.S. Pat. No. 2,279,859 teaches the use of a mould lubricant for articles to be vulcanised or moulded, which decomposes at the vulcanisation or moulding temperature and produces a cushion of inert gas which facilitates removal of the article from its mould. As the mould lubricant is a carbonate it evolves a carbon dioxide.

This evolution of gas is therefore a chemical reaction and is not a change of state within the meaning of the present application. Part of the mould lubricant employed normally remains in solid form and in actual practice it is both unreliable and hard to control. Further, this procedure requires relatively high temperatures, in any even greater than 100° C., which may be incompatible with the moulding of certain materials, namely the organic materials usually employed for moulding ophthalmic lenses.

This drawbacks are overcome according to the invention with a fusible material used as a moulding surface of a mould component.

These and other features and advantages of the invention will be brought out in the description which follows, given by way of example, with reference to the accompanying schematic drawings, in which.

The drawings illustrate, by way of example, the use of the invention for the moulding of an ophthalmic lens made of organic material, and more specifically, to the moulding of a so-called executive ophthalmic lens having along its convex face a sharp edge or ridge.

Figure 1:
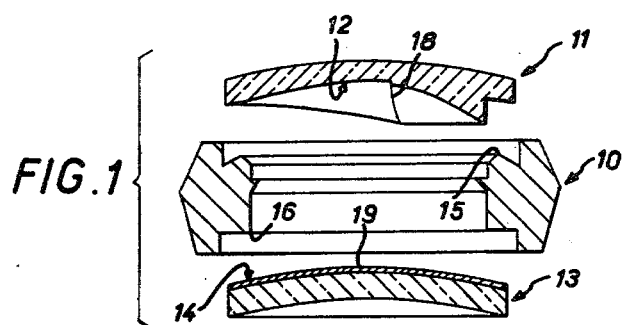
FIG. 1 is an exploded sectional view through the axis of a mould having a mould component made in part of a fusible material and embodying the invention.

As is known per se, such moulding is performed with a three-part mould comprising separate mould components, i.e., as shown in FIG. 1, an annular gasket or sealing member 10, and at opposite ends thereof, a casting die member having a concave moulding surface 12 and a casting die member 13 having a convex moulding surface. The annular gasket 10 is usually made of elastic material, e.g., a synthetic elastomer.

The structure of the annular gasket is well known in itself and its details are not part of the present invention and therefore such details need not be given here. Suffice it to say that the annular gasket has an annular ledge 15 for supporting die member 11 and another annular ridge 16 for supporting the other die member 13.

The die members 11 and 13 are usually made of mineral glass and, for example, at least the die members 11 is made of tempered mineral glass.

In the illustrated embodiment each die members has generally parallel faces inasmuch as its surfaces facing away from moulding cavity usually has the same contour as its moulding surface and therefore is convex when the moulding surface is concave and concave when the moulding surface is convex. Further, they are relatively thin, e.g., of the order of 4 to 10 mm.

But these features are not part of the present invention and therefore are in no way a limitation thereof.

In the illustrated embodiments, the article to be moulded being an executive ophthalmic lens, the casting die member 11 has across its moulding surface 12 a sharp ridge or edge 18 which divides it into two areas of different curvature.

Such a mould is adapted to mould any kind of organic material. When the article to be moulded is an ophthalmic lens the organic material is most often polyethylene glycol diallyl dicarbonate which sets or cures by polymerising. This material which is usually sold under the trade name "CR 39" requires the addition of a catalyst for its setting or curing and heat treatment.

In practice with a catalyst such as isopropyl percarbonate heat treatment lasts 18–20 hours, running from a starting temperature of 40° C. to a final temperature of 90° C.

The casting die member 13 employed comprises a transformable moulding surface. The casting die member 13 is made at least in part, from its moulding surface 14 and outwardly therefrom of a fusible material capable of releasing the material moulded in the cavity in the course of setting or curing and having a drop point or a softening point included in the range of temperatures concerned, i.e., the ambient temperature and 90° C. or more depending on the catalyst used.

As is known, the drop point is defined by the temperature at which the particular fusible material passes from its solid state to its liquid state. The softening point is defined in a similar manner by the temperature at which the fusible material passes from its solid state to a pasty or semiliquid state. In either case there is a change in state or a transformation which may be considered a change in state.

The fusible material employed may be paraffin wax which has a drop point of the order of 60° to 62° C., therefore included in the range of temperatures corresponding to the heat treatment to be applied for the setting or curing of polyethylene glycol diallyl dicarbonate catalysed with 3% by weight of isopropyl percarbonate.

In the illustrated embodiment only part of the casting die member 13 is made of fusible material, the casting die member 13 having a transformable surface film 19 of, for example, paraffin wax, as proposed above, which defines the moulding surface 14. The substrate is still made of mineral glass, as mentioned above, and in practice untempered glass. Preferably the surface of the glass substrate is frosted for good adherence of the paraffin wax.

Figure 2A:
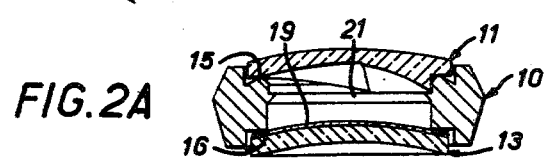
FIGS. 2A, 2B, 2C, 2D, 2E and 2F are sectional views on a different scale but otherwise similar to FIG. 1 of the mould, illustrating the various successive stages of the operation of the mould.
Figure 2B:
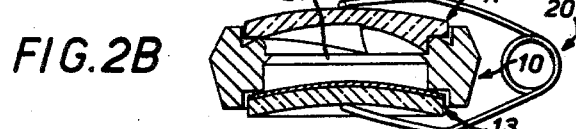

The casting die members 11 and 13 are assembled by the annular gasket 10, FIG. 2A, in the operative position and in a known manner they are urged against the ledges 15 and 16 on the gasket by means of resilient tongs or clamp 20, FIG. 2B. The details of the tongs or clamp, illustrated in the drawings, are not in themselves part of the present invention and therefore need not be described here in detail.

In any event the casting die members 11 and 13 are assembled together with the annular gasket 10 and they define in conjunction therewith a moulding cavity 21 by the parts of their moulding surfaces 12 and 14 inside the contour of the corresponding ledges 15 and 16 of the gasket.

Figure 2C:
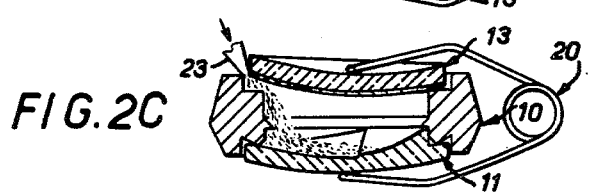

To fill the moulding cavity 21 with moulding material by means of an injection nozzle 23 one of the casting die members 11, 13 is moved slightly away from the annular gasket 10 and as schematically represented in FIG. 2C; it is most often the casting die member with the convex moulding surface.

Figure 2D:
Figure 2E:
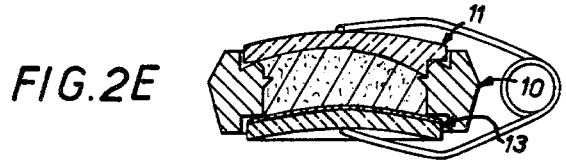

After filling and the mould is positioned so that the casting die member with the convex moulding surface is under the die member with the concave moulding surface (FIG. 2D), the mould may be placed in an oven at 40° C. and left for 4 to 6 hours, the time required for prepolymerisation of the moulding material 22 therein.

The temperature is then gradually raised to 90° C. for about 12 hours to obtain final polymerisation of the moulded material.

According to the invention, during the final heat treatment as soon as the temperature reaches the drop point or softening point of the transformable film 19 which defines part of the moulding cavity on casting die member 13, a change of state of the transformable film 19 is produced, either by melting or by softening, bringing about a separation of the casting die member 13 from the already prepolymerised moulded material.

Figure 2F:
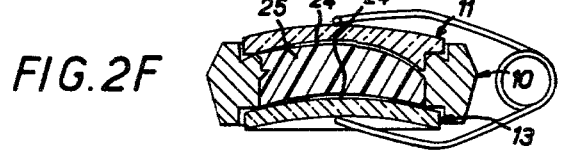

Thereafter a gap 24 appears between casting die member 13 and the prepolymerised moulded material 25 (FIG. 2F).

In other words, according to the invention, there is a controlled, systematic release from the casting die member 13 during the polymerisation of the moulded material.

Almost simultaneously, through the relieving of stresses which previously build up due to the shrinking of the moulded material, which shrinkage is about 5% at that moment, the casting die member 11 which is more fragile owing to the sharp edge or ridge 18 also separates from the prepolymerised moulded material 25 and is advantageously spared stresses.

A gap 24' then also develops between the casting die member 11 and the prepolymerised moulded material.

Once polymerisation is finished, in the customary manner, the resilient tongs or clamp 20 is removed, and therefore in order, the casting die member 11 with the concave moulding surface 12, the casting die member 13 with the convex moulding surface 14, whereupon the annular gasket 10 only has to be separated from the resultant lens. These steps may either be carried out at moderate temperatures or cold.

Figure 3A:
FIGS. 3A, 3B and 3C are schematic sectional view illustrating various stages of the formation of a fusible material on a moulding surface of a mould component for a mould embodying the invention.
Figure 3B:
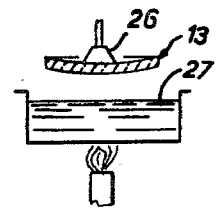
Figure 3C:
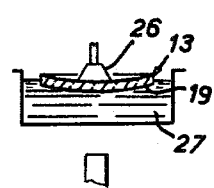

FIGS. 3A, 3B and 3C illustrate, by way of example, a method for providing a transformable film 19 on the moulding surface of the casting die member 13. According to this procedure, the transformable film 19 is formed by a coating applied in situ on the die member 13 as follows. A suction member 26 or other suitable gripping means is secured to the die member 13 to facilitate handling. The die member 13, at a cold temperature, is brought into position with its convex surface to be coated above a bath 27 of fusible material to be applied, e.g. molten paraffin wax in the present example, the bath being maintained in a liquid state by heating to a temperature greater than the drop point of the paraffin wax (FIG. 3).

The die member 13 is then immersed in bath 27 (FIG. 3B) and in contact with the cold convex surface of the die member, the molten paraffin wax coagulates thereby forming the desired transformable film 19. The die member 13 is then quickly withdrawn from the bath 27 (FIG. 3C) as soon as it is completely coated with a film of paraffin wax, to prevent the adhering paraffin wax to remelt by reason of the conductive heating which the die member 13 is inevitably subjected when immersed in the bath 27.

It goes without saying that other methods or procedures may be contemplated for applying the desired transformable film 19. For example, this may be carried out by coating with a brush, centrifugation or depositing by means of a thermostatic applicator. A separate preformed film may also be attached to the die member 13.

Further, materials other than paraffin wax may be suitable to obtain the transformable film. They may be wax, or paraffin-based compositions and/or wax and/or thermoplastic polymers, all having the desired release temperature, this temperature taking into account the monomer to be polymerised, the polymerisation catalyst employed and the corresponding polymerisation cycle.

It may also be a fusible metal or alloy, namely Wood's metal, a lead- and tin-based alloy having a drop point between 60° and 65° C.

In practice a very thin transformable film is enough to obtain the sought after release effect. This thickness may be of the order of several hundredths or tenths of a millimeter.

Moreover, alternatively, the entire die member 13 may be made of a fusible material if desired, this die member then being a throwaway mould component or reconditionable mould component by recovering all its constituent material after melting.

In addition, the present invention is not limited to the embodiment particularly described and illustrated herein.

In particular the die member having the convex moulding surface is not necessarily the one which is provided with the fusible material. It may just as well be the die member with the concave moulding surface.

Moreover, only part of the total moulding surface may be made of fusible material; for example, in the case of executive type ophthalmic lenses only one of the areas delimited or bounded by the sharp ridge or edge on the die member having the concave moulding surface may be provided with fusible material. Alternatively, the mould component of fusible material may be formed as a ring on one of the die members for optically monitoring the operative central area of the semi-finished lenses obtained.

Moreover, although the present invention is particularly suitable for moulding ophthalmic lenses of the executive type made of organic material the field of the invention is not limited to moulding the same. On the contrary it covers, in general, moulding of any kind of material requiring heat treatment for its setting or curing.

What I claim is:

1. A method of moulding materials requiring heat treatment for setting or curing in which a mould is used having a plurality of mould components with moulding surfaces together defining a moulding cavity, said method comprising the steps of forming at least part of one of the mould components of a fusible material, the fusible material extending along at least part of the associated moulding surface and outwardly therefrom, the fusible material having a predetermined point at which release occurs at a predetermined temperature in the course of setting or curing of the material being moulded whereby the release or separation occurs without jeopardizing the ultimate qualities of the moulded article.

2. The method according to claim 1, the predetermined point of the fusible material is a drop point or softening point within the range of temperatures for heat treatment for setting or curing the moulding material.

3. The method according to claim 1 or 2, providing a substrate for said one mould component having a higher drop point and softening point than the fusible material, wherein the forming step comprises forming a surface film in situ on the substrate of said one mould component.

4. The method according to claim 1 or 2, providing a substrate for said one mould component having a higher drop point and softening point than the fusible material, wherein the forming step comprises pre-forming a film of fusible material and then attaching it to the substrate of said one mould component.

5. The method according to claim 1 or 2, the moulding cavity being shaped for moulding an ophthalmic lens therein, the fusible material moulding one of the faces of the ophthalmic lens.

6. A method of moulding materials requiring heat treatment for setting or curing in which a mould is used having a plurality of mould components with moulding surfaces together defining a moulding cavity, said method comprising the steps of: forming at least part of one of the mould components of fusible material, the fusible material extending along at least part of the associated moulding surface and outwardly therefrom the fusible material having a drop point or softening point which occurs at a predetermined temperature during heat treatment whereby premature release or separation occurs without jeopardizing the ultimate qualities of the moulded material; filling the moulding cavity with the moulding material; applying heat to said moulding material in the mould to set or cure the moulding material, and wherein when the temperature of the fusible material reaches its drop point or softening point the moulded material is effectively released from the corresponding part of said moulding surface of the one mould component formed in part of fusible material; continuing the heat treatment until completed; and removing the moulded article from the mould.

* * * * *